United States Patent
Glover et al.

(10) Patent No.: US 12,474,256 B2
(45) Date of Patent: Nov. 18, 2025

(54) APPARATUS FOR THE MEASUREMENT OF LIGHT TRANSMITTANCE THROUGH A LIQUID SAMPLE USING MULTIPLE LED LIGHT SOURCES

(71) Applicant: REAL TECH INC., Whitby (CA)

(72) Inventors: James Andrew Glover, Oshawa (CA); Kerim Kollu, Ottawa (CA)

(73) Assignee: Real Tech Holdings Inc., Whitby (CA)

( * ) Notice: Subject to any disclaimer, the term of this patent is extended or adjusted under 35 U.S.C. 154(b) by 224 days.

(21) Appl. No.: 18/275,715

(22) PCT Filed: Feb. 8, 2022

(86) PCT No.: PCT/CA2022/050178
§ 371 (c)(1),
(2) Date: Aug. 3, 2023

(87) PCT Pub. No.: WO2022/165610
PCT Pub. Date: Aug. 11, 2022

(65) Prior Publication Data
US 2024/0118193 A1  Apr. 11, 2024

Related U.S. Application Data

(60) Provisional application No. 63/146,978, filed on Feb. 8, 2021.

(51) Int. Cl.
*G01N 21/31* (2006.01)

(52) U.S. Cl.
CPC ..... *G01N 21/31* (2013.01); *G01N 2201/0627* (2013.01)

(58) Field of Classification Search
CPC ........... G01N 2021/3181; G01N 21/05; G01N 21/255; G01N 21/31; G01N 21/85; G01N 2201/0627; G01N 33/1806; G01N 33/1893
See application file for complete search history.

(56) References Cited

U.S. PATENT DOCUMENTS

| | | |
|---|---|---|
| 7,198,755 B2 | 4/2007 | Tokhtuev et al. |
| 10,041,923 B1 | 8/2018 | Streett et al. |

(Continued)

FOREIGN PATENT DOCUMENTS

| | | |
|---|---|---|
| EP | 2927668 A1 | 10/2015 |
| ES | 2325804 A1 | 9/2009 |
| WO | 2019/204840 A1 | 10/2019 |

OTHER PUBLICATIONS

European Office Action for Application No. 22748780.8, dated Dec. 11, 2024, 12 pages.

(Continued)

*Primary Examiner* — Hina F Ayub
(74) *Attorney, Agent, or Firm* — McCarter & English, LLP; Michael M. Gnibus

(57) ABSTRACT

This disclosure relates to an apparatus for measuring the transmittance of several wavelengths of light through a liquid sample in order to measure or estimate established and novel quality parameters that are descriptive of the quality of the liquid being monitored. The apparatus comprises at least two light emitting diode (LED) modules; each comprising an LED light source and a beam splitter window; a cylindrical rigid structure, a mounting structure, a window aperture, a mechanism for fixing the position of the LED modules, at least one LED light detector, a liquid sample light detector, a microprocessor, and an enclosing structure surrounding the apparatus. The apparatus provides a means for fine tuning the alignment of the light beams generated by the LED light sources, which ensures that the light beams are propagated optimally within the apparatus body and measured accurately by the light detectors.

29 Claims, 4 Drawing Sheets

(56) References Cited

U.S. PATENT DOCUMENTS

| | | |
|---|---|---|
| 2018/0238845 A1 | 8/2018 | Eliason et al. |
| 2020/0209208 A1 * | 7/2020 | Li et al. |
| 2021/0076941 A1 * | 3/2021 | Van Laar ............... G06N 3/043 |
| 2021/0239604 A1 * | 8/2021 | Huemer ................ G01N 21/31 |

OTHER PUBLICATIONS

International Search Report and Written Opinion for Application No. PCT/CA2022/050178, dated Jun. 27, 2022, 7 pages.

International Preliminary Report on Patentability for Application No. PCT/CA2022/050178, dated Aug. 17, 2023, 6 pages.

\* cited by examiner

APPARATUS FOR THE MEASUREMENT OF LIGHT TRANSMITTANCE THROUGH A LIQUID SAMPLE USING MULTIPLE LED LIGHT SOURCES

CROSS-REFERENCE TO RELATED APPLICATIONS

This patent application is a National Phase of PCT/CA2022/050178 filed on Feb. 8, 2022 and published on Aug. 11, 2022 as WO 2022/165610, in English, which claims the priority benefit from U.S. Provisional Patent Application No. 63/146,978 filed on Feb. 8, 2021, the contents of which are incorporated herein by reference in their entireties.

FIELD

The present disclosure relates to the field of liquid monitoring using an optical apparatus, and relates in general to measuring the quantity of a chemical or a group of chemicals in a solution by relying on spectrophotometric principles.

BACKGROUND

Most traditional methods employed for water quality analyses require considerable amounts of time for the analyses to be completed in addition to storing, conditioning and transporting of the samples to a laboratory. The additional steps involved between sample collection and laboratory analysis introduce errors as well as increase the time delay between collection of samples and test results. Therefore, there is need for a faster analysis of water quality parameters onsite without the need for storing, conditioning or transporting of the samples.

In the last two decades, devices relying on spectrophotometric principles have been developed to fill this niche for a number of water quality parameters. Spectrophotometric instruments can rely on different light sources to produce light at a range of wavelengths with variable degrees of stability. Recent developments in the light emitting diode (LED) technology increased the potential for LED light sources to be used in instrumentation optically measuring water quality parameters. As a cost-effective alternative to other light sources such as deuterium or xenon flash lamps, the LED technology is very promising for increasing access to such optical instruments for water quality monitoring. This, in turn, will allow for better management and protection of water sources, and better decision making, in general, for how process, clean and waste water streams are handled both in the industrial and municipal sectors. Since LEDs often emit a relatively narrow band of light wavelengths, typically, a number of LEDs are needed to provide a sufficient variety and range of light wavelengths for the monitoring of various water quality parameters, such as organics related parameters, color, nitrite, nitrate and hexavalent chromium.

The need for multiple LED light sources to be placed in a space-limited apparatus comes with challenges in regards to the accurate measurement of the light generated and transmitted as well as the optical alignment required for the optimum propagation of the light beam.

SUMMARY

This disclosure addresses the aforementioned issues that may arise in an optical liquid monitoring apparatus utilizing two or more LED light sources.

In an embodiment the present disclosure provides an apparatus for measuring the transmittance of several wavelengths of light through a liquid sample. The device consists of several LED modules responsible for the sourcing of several wavelengths of light attributed to the particular selection of the LED for each module. The LED modules are of cylindrical shape mounted in holes along the length of another larger mounting structure, also preferred to be of cylindrical shape. The LED modules incorporate the LED light sources at the outer end, and beam splitters mounted at the inner end at a 45 degree angle to the axis of the cylindrical shape of the LED modules. The LED modules are designed to allow rotation and translation around and along the axes of the holes they are mounted in before being fixed in a final position. This allows them to be finely adjusted to allow the resulting 90 degree reflected light beams from the beam splitters to be aligned into one collinear light beam path. The LEDs are activated separately such that only one wavelength is activated at a time. The reflected light beams are directed through a flow cell or other region of sample water and then into a single light detector. The propagated light received by the light detector through the sample water is recorded for each LED independently, providing a recorded signal of each wavelength of light associated with the individual LED modules. A microprocessor then processes the recorded data using spectrophotometric computation techniques to determine information of interest for the application such as concentration information about a particular compound in the sample water.

BRIEF DESCRIPTION OF THE DRAWINGS

The present disclosure will be more fully understood from the following detailed description thereof taken in connection with the accompanying drawings, which form a part of this application, and in which.

DETAILED DESCRIPTION

Without limitation, the majority of the systems described herein are directed to an apparatus and method of measuring optical properties of water. As required, embodiments of the present invention are disclosed herein. However, the disclosed embodiments are merely exemplary, and it should be understood that the invention may be embodied in many various and alternative forms.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to real-time industrial and municipal water and liquid quality monitoring.

As used herein, the term "about" or "approximately", when used in conjunction with ranges of dimensions, temperatures or other physical properties or characteristics is meant to cover slight variations that may exist in the upper and lower limits of the ranges of dimensions as to not exclude embodiments where on average most of the dimensions are satisfied but where, statistically, dimensions may exist outside this region. For example, in embodiments of the present invention dimensions of components of an apparatus and method of measuring optical properties of water are given but it will be understood that these are non-limiting.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the term "fluid" refers to any liquid, gas, or substance that continually deforms under an applied shear stress.

As used herein, the term "light" refers to any electromagnetic radiation, and is not limited to wavelengths of visible light. For example, "light" may refer to radio waves, microwaves, infrared radiation, visible light, ultraviolet radiation, X-rays, or gamma rays.

Figure 1:
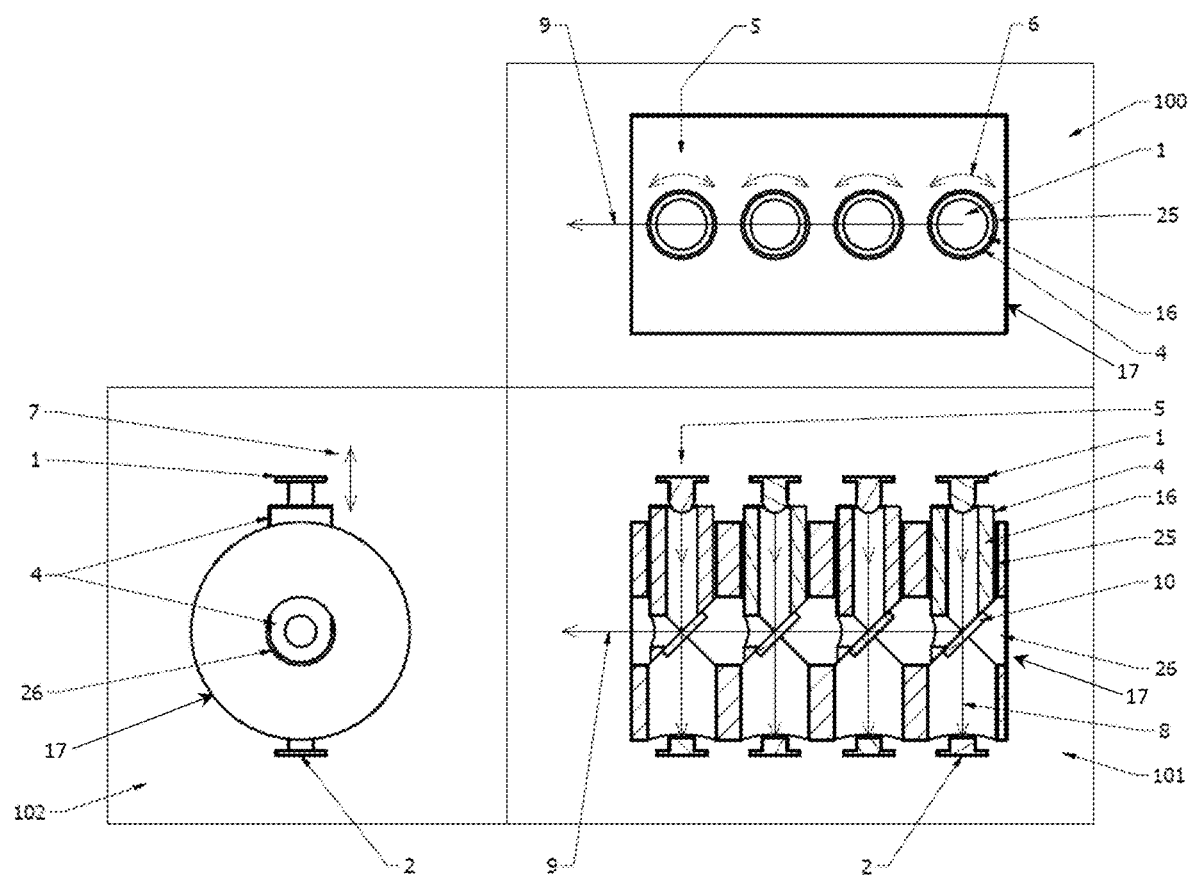
FIG. 1 is a drawing showing a side view, top view and end view of an optical module constructed in accordance with the present invention.
Figure 2:
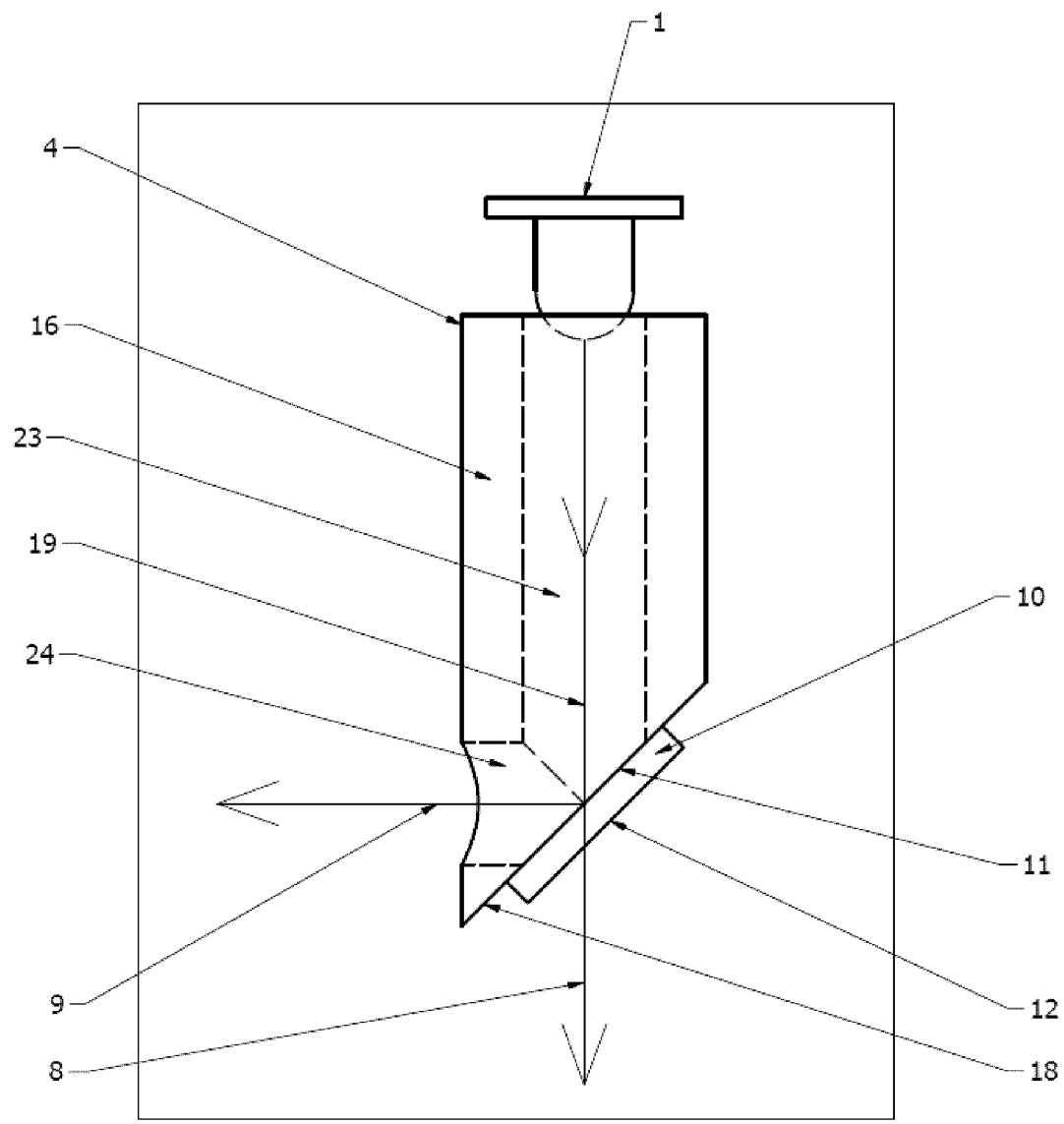
FIG. 2 is a drawing showing a side view of an LED module constructed in accordance with the present invention.

Referring to FIG. 1, an optical module is shown generally with side view at 100, with top view at 101, and with end view at 102 constructed in accordance with the present disclosure. LED modules 4 shown in FIG. 1 and also shown in detail in FIG. 2, are comprised of a light emitting diode (LED) light source 1, a cylindrical rigid structure 16, and a beam splitting window 10. The apparatus disclosed herein contains at least two LED modules 4 although a preferred embodiment of the device contains four (4) LED modules 4, but it will be appreciated the device is not limited to four, there could be more Note FIG. 1 shows a preferred embodiment with four LED modules.

Referring to FIG. 2, the cylindrical rigid structure 16 of each LED module 4 must be wide enough in diameter to allow a beam splitting window 10 to be mounted at one end, and an LED light source 1 at the opposite end. In a preferred embodiment the beam splitting window 10 is 10 mm in diameter although other diameters are also acceptable, and has a first surface 11 treated such that a portion of incident light is transmitted and a portion of incident light is reflected. The diameter of the cylindrical rigid structure 16 is not less in diameter than the diameter of the beam splitting window 10. In a preferred embodiment the beam splitting window 10 is affixed to the cylindrical rigid structure 16 using glue although other means are also acceptable. The mounting surface 18 for the beam splitting window 10 should be at an angle to the axis of the cylindrical rigid structure 16 such that the partially reflecting beam splitting window first surface 11 will reflect a portion of the incident light beam 19 from the LED light source 1 at substantially 90 degrees to the incident LED light beam 19 and to the axis of the cylindrical rigid structure 16. In a preferred embodiment the normal of the mounting face of the cylindrical rigid structure is 45 degrees to the axis of the cylindrical rigid structure.

Referring to FIG. 2, the cylindrical rigid structure 16 has a first hole 23 along its center axis through the full length, and a second hole 24 with axis substantially 90 degrees to the axis of the first hole. The axis of the first hole 23 is coincident with the incident light beam 19 and the axis of the second hole 24 is coincident with the reflected light beam 9 produced by the beam splitter 10. The axis of the second hole 24 is coplanar with the normal of the beam splitter window mounting surface 18 of the cylindrical rigid structure 16 and the center axis of the cylindrical rigid structure. The axis of the second hole 24 is co-incident with the point formed by the intersection of the mounting surface 18 and the center axis of the cylindrical rigid structure. The beam splitting window 10 is affixed to the cylindrical rigid structure 16 such that the partially reflective first surface 11 of the beam splitter window 10 is coplanar with the mounting surface 18 of the cylindrical rigid structure 16.

In operation electrical current is supplied to the LED 1 of an LED module 4, and light propagates along the center axis of the cylindrical rigid structure 16 of the LED module 4. Referring to FIG. 2, the, once the light from the LED 1 reaches the first surface 11 of the beam splitting window 10, a first portion of the light is allowed to transmit through the beam splitting window 10 where it continues parallel to the center axis of the cylindrical rigid structure 16 and offset to the side (not shown in figures) by an amount dependent on the thickness of the beam splitter window 10 and referring to FIG. 1 is incident on light detector 2. A second portion of the light from the LED 1 is reflected by the first surface 11 of the beam splitter window 10 along the axis of the second hole 24 of the cylindrical rigid structure 16.

The second surface 12 of the beam splitter window 10 may be coated with an anti-reflective coating to prevent unnecessary loss of light and reduce stray light in the optical system. The LED modules 4 may include additional optics for focusing the LED light source 1 such as a ball lens or half ball lens mounted close to the LED light source 1.

Referring to FIG. 1, the LED modules 4 are inserted into a mounting structure 17, wherein the mounting structure 17 contains at least two mounting holes 25 to receive at least two LED modules 4 but if more than two LED modules 4 are used it will have the same number of mounting holes as there are LED modules 4. The diameter of the mounting holes 25 are not less than the diameter of the LED modules 4. The mounting holes are of a diameter that constrains the movement of the LED modules to a translational movement indicated by the bi-directional arrows 7 along the first axis of the LED module's cylindrical rigid structure 16, and to rotational movement 6 (shown by the bidirectional arcuate arrows 6) of the LED modules around the first axis of the LED module's cylindrical rigid structure 16. The mounting structure 17 also contains a primary hole 26 substantially through the center that is orthogonal to and intersecting each center axis of the LED module's cylindrical rigid structures 16.

Figure 3:
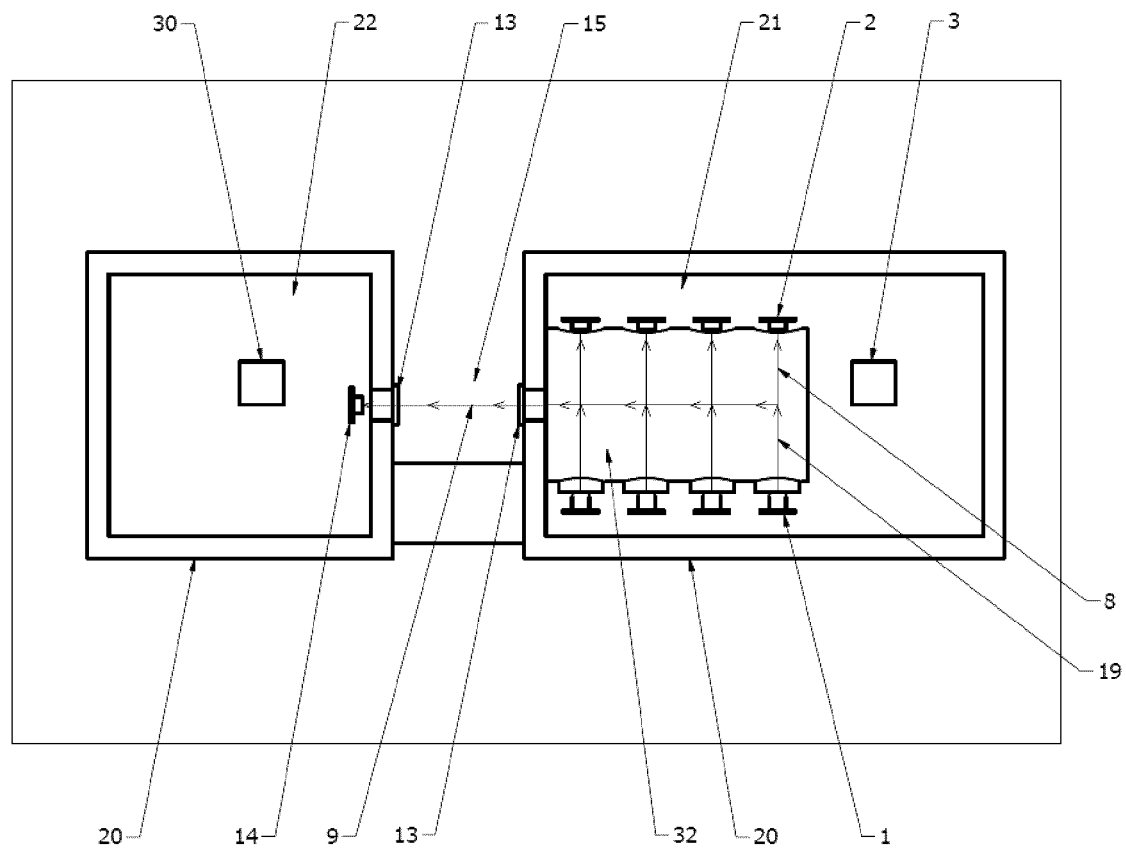
FIG. 3 is a drawing showing a submersible liquid sample light transmittance measuring device in accordance with a first embodiment of the present invention.
Figure 4:
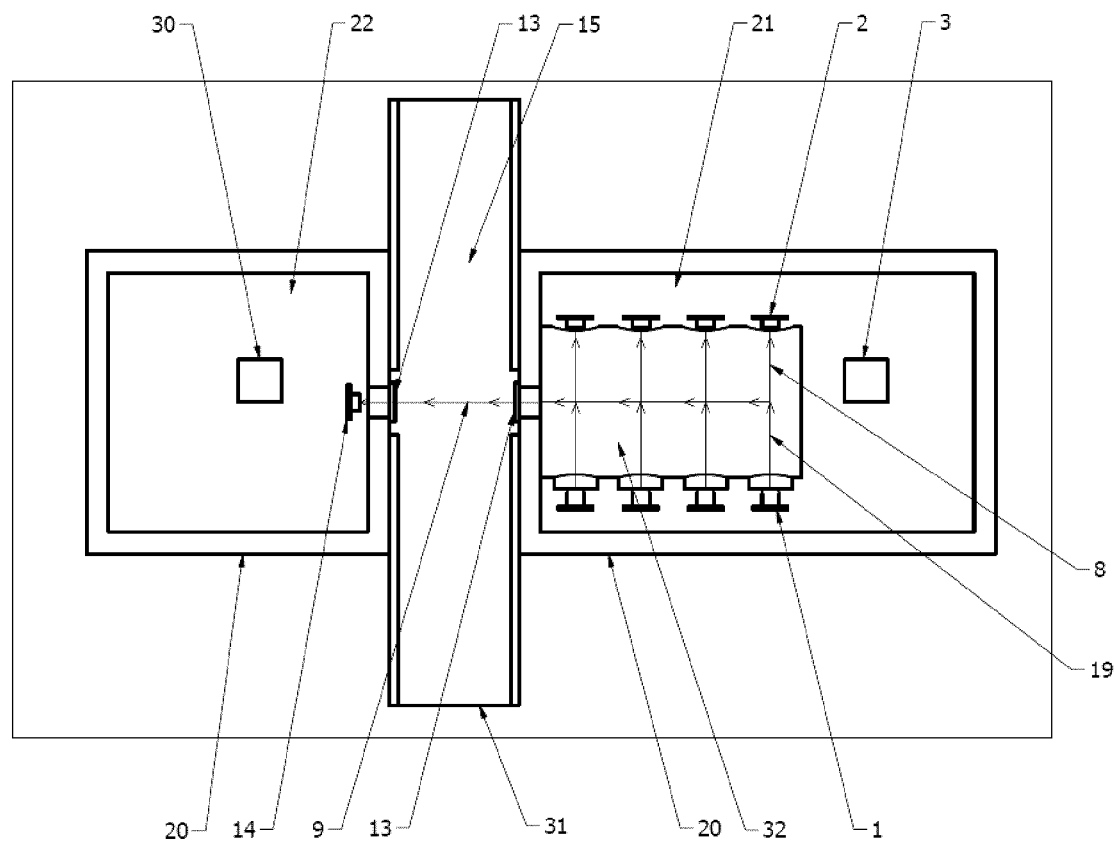
FIG. 4 is a drawing showing a submersible liquid sample light transmittance measuring device in accordance with a second embodiment of the present invention which uses a flow cell configuration.

The rotational movement indicated by arcuate arrows 6 and translational movement indicated by straight arrows 7 of the LED modules 4 allows adjustment and fine tuning of the direction of the reflected LED light beams 9 from each LED module 4, whereby the reflected LED light beams 9 from the LED modules 4 can be accurately aligned with each other, substantially along or closely parallel to the axis of the primary hole 26 though the mounting structure 17 and, referring to FIGS. 3 and 4, through the liquid sample 15 and windowed apertures 13, towards the liquid sample light detector 14. The process of alignment is intended to be performed at the time of manufacture of the device but could be performed subsequently as needed in order to ensure optimal alignment of the light beams. The alignment process in a preferred embodiment is a manual process performed during manufacture, but in another embodiment the procedure could be performed using additional electromechanical components such as motors or linear actuators. The translational and rotational movement of LED modules 4 is controlled by the microprocessors 3 or 30 which are coupled to actuators interfaced with the modules 4 and the microprocessors 3 or 30 to provide adjustment and fine tuning of the direction of the reflected LED light beams 9 from each LED module 4.

Once the reflected LED light beams 9 are satisfactorily aligned, the LED modules 4 are substantially fixed in a position in which they remain during general operation of the detection device. The LED modules 4 can be fixed in a variety of ways including but not limited to glue, locking nuts or set screws. In a preferred embodiment two set screws are used to fix the position of each LED module 4, wherein the two set screws are spaced along the length of the cylindrical rigid structure 16 of the LED module 4. The reflected LED light beam 9 from an LED module 4 in any position other than the first place position 5 will reach the second surface 12 of the beam splitting window 10 in front of it at which point some light will inevitably reflect but the majority of the light will propagate to the first surface 11 coated with partially reflective coating. At the first surface 11 a portion of the light will be again reflected based on the properties of the coating, and a portion of the light will propagate through substantially collinear with the reflected LED light beams 9 from the other LED modules 4.

In another embodiment of the invention (not shown in the figures), the LED 1 may be affixed to the mounting structure 17 instead of the cylindrical rigid structure 16, and the beam splitting windows 10 and the transmitted LED light detector 2 could be affixed to the cylindrical rigid structure 16 to form a module similar to the LED module 4 described above. This new module would have a cylindrical shape similar to the LED module 4 and would facilitate adjustability of the rotational and translational position of the beam splitting window 10 and therefore still provide the ability to fine tune the alignment of the reflected LED light beams 9. Although this arrangement is a possible embodiment of the present device, it is not the preferred embodiment, as there are advantages to having the LED 1 and the beam splitting window 10 affixed to the same rigid body especially in relation to precision optical assembly and alignment.

Referring to FIGS. 3 and 4, an enclosing structure 20 defines a first enclosed region 21 which surrounds the LED modules 4, mounting structure 17, and transmitted LED light detector(s) 2. The enclosing structure 20 also defines a second enclosed region 22 which surrounds the liquid sample light detector 14. Opposed windowed apertures 13 are substantially transparent to the aligned reflected LED light beams 9 and are embedded in the enclosing structure 20 and positioned in registration with the aligned reflected LED light beams 9, such that the normals of the windowed apertures 13 are substantially collinear with the aligned reflected LED light beams 9. The opposed windowed apertures 13 may be made of several materials depending on the properties of the liquid sample 15 as well as the wavelengths of light to be measured, wherein these materials may be sapphire, fused silica, optical glass, or other material substantially transparent to the wavelengths or groups of wavelengths to be measured.

Referring to FIG. 3, a first embodiment of the device is shown. The first embodiment of the device is intended to be used for submersible applications, whereby the device is substantially submersed in a sample liquid to be measured by the device. The liquid sample 15 surrounds the enclosing structure 20 and is able to freely flow between the two opposed windowed apertures 13 embedded in the enclosing structure 20, and such that a light path is defined from the first enclosed region 21 to the second enclosed region 22 and through the opposed windowed apertures 13, and through the liquid sample 15, wherein the light path is comprised of reflected LED light beams 9 equal to the number of LED modules 4 in the optical module 32, and is incident on the active area of the liquid sample light detector 14.

Referring to FIG. 4, a second embodiment of the device is shown. The second embodiment of the device is intended to be used for flow through, slip stream, or inline applications, whereby the device is mounted to a flow through structure 31, though which flows a sample liquid to be measured by the device. The flow through structure 31 could be one of a flow cell, pipe, or pipe manifold. The liquid sample 15 flow through the flow through structure 31 and is directed substantially though enclosing structure 20 and between the two opposed windowed apertures 13 embedded in the enclosing structure 20, and such that a light path is defined from the first enclosed region 21 to the second enclosed region 22 and through the opposed windowed apertures 13, and through the liquid sample 15, wherein the light path is comprised of reflected LED light beams 9 equal to the number of LED modules 4 in the optical module 32, and is incident on the active area of the liquid sample light detector 14. In the preferred embodiment, the liquid sample 15 may freely and continuously flow through the flow through structure 31. However, in another embodiment, the liquid sample 15 could be otherwise flow controlled such that the device measures a relatively static liquid sample, or such that the device measures batches of liquid sample. Additional collimating or focusing optics can be employed along the paths of the reflected LED light beams 9 in the first enclosed region 21 or the second enclosed region 22, or both, in order to improve the light throughput of the optical system, or to reduce stray light, or to reduce the effects of ambient light contaminating the measurement of the liquid sample light detector 14. These optics can be comprised of various combinations of plano-convex, or double-convex lenses in addition to other lenses and optical filters.

Referring to FIG. 1, the transmitted LED light detectors 2 are affixed to the mounting structure 17 at substantially 180 degrees to the transmitted LED light beam 8 from an LED module 4. In a preferred embodiment there is one transmitted LED light detector 2 for each LED module 4, with four (4) of them being shown in FIG. 1. The transmitted LED light detectors 2 are used to measure and record as a digital value the light intensity of an LED light source 1 in an LED module 4. The digital values are used to compensate measurements made by the liquid sample light detector 14 for changes in the light output of the LEDs 1 that would otherwise result in measurement error.

Because the reflected LED light beam 9 from a given LED module 4 will be partially reflected again by the beam splitter window 10 from an adjacent LED module 4, this means that the LED intensity from a given LED module 4 may be compensated using either a transmitted LED light detector 2 directed at 180 degrees to the transmitted LED light beam 8 from the given LED module 8, or it may be compensated using a transmitted LED light detector 2 directed at 180 degrees to the transmitted LED light beam 8 from the adjacent LED module 4, or from an even further away LED module 4. Note that the signal to the transmitted LED light detector will be weaker when the LED light detector is used for compensating LED intensity from adjacent or further LED modules 4, compared with the LED module 4 which the LED light detector is substantially aligned with at 180 degrees. Therefore, the invention can function with fewer transmitted LED light detector(s) 2 than the number of LED modules 4, although the performance of the optical system will be reduced due to reduced signal reaching the transmitted LED light detector(s) 2.

In another embodiment there is at least one transmitted LED light detector 2 but less than the number of LED modules 4. In this embodiment, at least one of the transmitted LED light detectors 2 measures and records at least two digital values the amount of light output by at least two LEDs 1 at different times. The digital values are used to compensate the measurements made by the liquid sample light detector 14 for changes in the light output of the LEDs 1 that would otherwise result in measurement error.

Referring to FIGS. 3 and 4, in a preferred embodiment, a first microprocessor 3 is enclosed in the first enclosed region 21 and is connected to the LED light sources 1 and the transmitted LED light detector(s) 2, and a second microprocessor 30 is connected to the liquid sample light detector 14 and is enclosed in the second enclosed region 22 as illustrated. Multiple LEDs 1 can be activated independently via the connected microprocessor 3 in enclosed section 21. In a preferred embodiment, first microprocessor 3 is the primary microprocessor used for processing sample data, and is digitally connected to the second microprocessor 30 whereby sample data from the liquid sample light detector 14 is transmitted from the second microprocessor 30 to the first microprocessor 3 for further processing and compensation calculations incorporating compensation data from the transmitted LED light detector(s) 2. The use of two microprocessors 3 and 30 in the preferred embodiment as described allows the sensitive analog signals from the transmitted LED light detector(s) 2 connected to the first microprocessor and the sensitive analog signals from the liquid sample light detector 14 to transmit the shortest distance possible before signal conditioning and digitization via the microprocessor and associated circuitry. This reduces the potential for noise to be introduced to the sensitive analog signals from the light detectors. Another embodiment can use a single microprocessor to receive signals from the transmitted LED light detector(s) 2 and also from the liquid sample light detector 14, although this embodiment would be more susceptible to interference and noise and so will affect the potential performance of the device.

In an embodiment of the present disclosure, the microprocessor 3 is programmed to first signal to activate one of the multiple LEDs 1 for a period of time. During that time, the second microprocessor 30 reads the signal from the liquid sample light detector 14 and transmits the corresponding digital values to the first microprocessor 3, and the first microprocessor 3 reads the signal from the transmitted LED light detector 2 associated with the activated LED 1. After the digital values are stored, the LED 1 is deactivated. This procedure is repeated for each LED 1. The digital value attributed to the liquid sample light detector 14 is generally a function of the intensity of light emitted from the activated LED 1, and the presence of matter in the liquid sample 15 that absorbs light at the wavelength or set of wavelengths emitted by activated LED 1 and detected by the liquid sample light detector 14.

The first microprocessor 3 is programmed so that it is able to compensate the digital value attributed to the liquid sample light detector 14 for changes in the light intensity of the activated LED 1 through use of a compensation computation incorporating the digital value attributed to the transmitted LED light detector 2 associated with the activated LED 1, thereby substantially eliminating error due the changes in light intensity of the activated LED 1 over time.

In an embodiment, this entire procedure is repeated continuously to provide near continuous measurement of the light transmittance of the liquid sample 15 to the wavelengths of light emitted by the LEDs 1. In other embodiments, this entire procedure may be timed to perform at certain time intervals or may be triggered by an operator or other outside mechanism. The LEDs 1 may be activated in any particular order as the measurement of the transmittance of the liquid sample 15 for the wavelengths associated with a given activated LED 1, is completely independent of the measurement of transmittance for any other activated LEDs 1. The LED light sources 1 associated with each LED module 4 may be selected to produce light of mutually exclusive wavelength bands to each other, or may be selected to produce light of overlapping but substantially different wavelength bands.

Computed transmittance measurements for liquids containing known levels of light transmittance for different wavelengths may be stored in memory associated with the microprocessor 3. This allows future ratios of liquids containing unknown levels of light absorbing matter to be compared with the stored values to allow correlations between the measured transmittance of light through the liquid sample at different wavelengths and the actual level of light absorbing matter in the liquid sample. The accuracy and range of the apparatus for measuring the light transmitted through the liquid sample 15 is directly affected by the length of the light path through the thickness of the liquid sample. This path length is determined by the distance between the windowed apertures 13 and can be any distance in theory, though practical constraints limit this distance to be generally but not limited to between about 0.1 mm and about 300 mm. A longer light transmittance path length distance through the liquid sample can improve performance when measuring the light transmittance of liquid with high purity, yet this can decrease performance when measuring the light transmittance of liquid with low purity. A shorter light transmittance distance through the liquid can reduce performance when measuring the light transmittance of liquid with high purity, yet this can increase performance when measuring the light transmittance of liquid with low purity. The final computed light transmittance value can be scaled in software to provide a measurement relative to a particular light transmittance distance through the liquid.

The first microprocessor 3 can be programmed to determine when the intensity of light from the activated LED 1 has become stable enough to take a measurement by measuring and comparing the light source intensity using the transmitted LED light detector 2 at predetermined time intervals. In a preferred embodiment the LEDs 1 are stable enough to take a measurement after between 0.1 ms and 1 s.

The accuracy of light detector readings, whether they measure the LED light source intensity directly or the amount of light transmitted through the liquid sample, can be improved by using signal conditioning electronics and/or by using various software averaging algorithms. In the preferred embodiment of the invention, signal conditioning electronics is used to improve light detector reading accuracy. Such signal conditioning electronics include but are not limited to trans-impedance amplifiers, signal gain amplifiers, and analog to digital converters (ADCs). Software running on the first microprocessor 3 can be implemented to average sample sets read from the liquid sample light detector 14, thereby smoothing out the measured signal. This can further improve the accuracy and increase the signal to noise ratio.

The electrical current being provided to the LED light sources 1 can be adjustable for each LED 1 based on the relative light intensity particular to the selected LEDs which are designed to produce light of substantially different wavelengths, to allow substantial balancing of the intensity of the reflected LED light beams 9 from the different LED modules 4. This allows improvement of the performance of the liquid sample light detector 14 due to practical limitations on the dynamic range of the detector and signal conditioning electronics.

The coating used for the beam splitting windows 10 for each LED module 4 can be based on the relative position 5 of the associated LED modules 4 in the mounting structure 17 in addition to the relative light intensity particular to each LED 1, to allow substantial balancing of the reflected LED light beams 9 from the different LED modules 4 to improve the performance of the liquid sample light detector 14 due to practical limitations on the dynamic range of the detector and signal conditioning electronics. In a preferred embodiment, a particular combination of beam splitters are used with beam splitter coatings of 30/70, 50/50, and 70/30 reflection/transmission for the above mentioned balancing of the reflected light beams 9. However, other reflection/transmission ratios could be used.

The first microprocessor 3, in a preferred embodiment, includes means of communication and interaction with systems external to the device including programmable logic controllers (PLCs), data loggers, operator interface, or a visual display.

The first microprocessor 3 is further programmed to store a measurement of the transmittance of a liquid of known transmittance for each wavelength. Further the microprocessor may compute a ratio of a measurement of transmittance of the liquid sample relative to the stored measurement of known transmittance, resulting in a relative measurement of percent transmittance of the liquid sample 15 for each wavelength. For applications desiring a calculation of the light absorbance of the liquid sample 15, the first microprocessor 3 is programmed to calculate the light absorbance by evaluating a negative logarithm of the measured light transmittance. The first microprocessor 3 may use a software trending algorithm to allow the transmittance to be predicted based on short term trending of light detector signals. The first microprocessor 3 may use a correction algorithm to calculate an adjusted value of percent transmittance for each wavelength, to compensate from any linear or non-linear error created by various elements of the optical system. The correction algorithm may be a lookup-table of values, or may be a linear or non-linear equation, or may be a more complex processing algorithm including machine learning based algorithms.

The first microprocessor 3 may be programmed to compute further output values based on multiple liquid sample transmittance values attributed to different wavelengths of light as output from the selected LEDs 1. These output values may be substantially representative of water quality parameters or properties. The output values from the detector can be determined using pre-determined weightings of multiple transmittance values attributed to different wavelengths of the LEDs 1. In addition, more complex processing algorithms may be used to calculate output values of the invention including machine-learning based algorithms.

The particular LED light sources 1 used in the apparatus are primarily selected for their wavelength spectrum of emitted light. Different combinations of LEDs may be selected based on one or more water quality parameters or properties desirable for a particular application of the invention.

Water quality parameters or properties can be standard laboratory test parameters such as internationally recognized BOD (biochemical oxygen demand) or COD (chemical oxygen demand) water quality parameters, but can also include specific compound concentration parameters such as nitrite or permanganate concentration parameters, and also can include novel parameters to represent some other aspect of the liquid sample composition or even just a composition change that may or may not be related to any specific existing common water quality parameter or compound concentration.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps, or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for measuring the transmittance of several wavelengths of light through a liquid sample, the apparatus comprising:
    a first region defined by a first enclosing structure comprising:
        at least two (2) light emitting diode (LED) modules whereby each of the at least two LED modules comprises a cylindrical rigid structure, an LED mounted to a first end of the cylindrical rigid structure, and a beam splitter mounted to a second end of the cylindrical rigid structure, such that light from the LED propagates along a center of the cylindrical rigid structure and is both partially reflected at 90 degrees and also partially transmitted at 0 degrees by the beam splitter;
        an optical module comprising a mounting structure and said at least two LED modules whereby each of the at least two LED modules is configured to contribute a specific wavelength or group of wavelengths of light, whereby the at least two LED modules are mounted substantially orthogonal to a length of the mounting structure, and whereby the at east two LED modules are adjustable in their alignment to each other through mechanical translation and rotation of at least one of the at least two LED modules about an axis of the cylindrical rigid structure of the at least one of the at least two LED modules in order to align resulting reflected light beams from the beam splitter of each of the at least two LED modules into one (1) resulting reflected light beam through a length of the optical module; and
        at least one LED light detector mounted substantially at 180 degrees to the axis of the cylindrical rigid structure of the at least one LED module, the at least one LED light detector being configured to sense a light intensity of said LED light from said at least one LED module; and a second region defined by second enclosing structure comprising:
  a liquid sample light detector mounted within said second region, substantially 180 degrees to said reflected light beams of the at least two LED modules;
  first and second windowed apertures substantially transparent to said reflected light beams positioned in registration with said reflected LED light beams of the at least two LED modules such that a normal of each of the first and second windowed apertures is substantially collinear with said reflected LED light beams of the at least two LED modules;
  a liquid sample present between the first and second windowed apertures defining a path therethrough for transmitting said reflected LED light beams of the at least two LED modules, said liquid sample light detector being configured to sense a light intensity of the reflected LED light beams of the at least two LED modules, after the reflected LED light beams of the at least two LED modules pass through said first and second windowed apertures and said liquid sample; and at least one (1) microprocessor connected to said LEDs, said at least one LED light detector, and said liquid sample light detector, wherein the at least one microprocessor is programmed to:
  activate each of the LEDs independently;
  record light intensity measurements from the at least one LED light detector and the liquid sample light detector;
  control the LEDs such that the LEDs are energized one at a time or in sub-groups of a total number of the LEDs, and subsequently measure and record via the liquid sample light detector an amount of light for a specific wavelength through said liquid sample, as defined by each of the LEDs or the sub-group of the total number of LEDs; and
  process the recorded amount of light using spectrophotometric computation techniques to calculate and output information, wherein re information comprises concentration information about a particular compound in the liquid sample.

2. The apparatus according to claim 1, wherein said at least one microprocessor is programmed to calculate a transmittance of the liquid sample to the light from LEDs and compensate for changes in LED intensity using recorded measurements from the at least one LED light detector and the liquid sample light detector.

3. The apparatus according to claim 1, further comprising set screws inside secondary holes of said mounting structure;
  wherein the set screws are each configured to fix a position of an associated one of the at least two LED modules, the set screws are mounted in the mounting structure such that tightening of each of the set screw presses a side of the associated one of the at least two LED modules to prevent movement of the associated one of the at least two LED modules.

4. The apparatus according to claim 1, wherein each of the at least two LED modules include optics configured to focus the LED, said optics including any one of a ball lens or a half ball lens.

5. The apparatus according claim 1, wherein the first and second windowed apertures are made from sapphire.

6. The apparatus according to claim 1, wherein the first and second windowed apertures are made from fused silica.

7. The apparatus according to claim 1, wherein the first and second windowed apertures are made from optical glass.

8. The apparatus according to claim 1, wherein the LEDs of the at least two LED modules are configured to produce light of mutually exclusive wavelength bands.

9. The apparatus according to claim 1, wherein the LEDs of the at least two LED modules are configured to produce light of overlapping but substantially different wavelength bands.

10. The apparatus according to claim 1, wherein electrical current is configured to be provided to the LEDs of the at least two LED modules and is configured to be adjustable based on relative light intensity inherent in LEDs designed to produce light of different wavelength, to allow substantial balancing of said reflected LED light beams from different ones of the at least two LED modules.

11. The apparatus according to claim 1, wherein different coatings are used for different beam splitting windows based on a relative position of the at least two LED modules in the mounting structure.

12. The apparatus according to claim 1, wherein different coatings are used for different beam splitting windows based on a relative light intensity inherent in the LEDs of the at least two LED modules designed to produce light of different wavelengths, to allow substantial balancing of said reflected LED light beams from different ones of the at least two LED modules.

13. The apparatus according to claim 1, wherein the reflected light beam from each of the at least two LED modules is substantially incident on the at least one LED light detector, whereby there is one LED light detector for every one the at least two LED modules.

14. The apparatus according to claim 1, wherein a number of the at least one LED light detector used to measure light from the at least two LED modules is greater than zero but less than a number of the at least two LED modules.

15. The apparatus according to claim 1, further comprising a visual display configured to be controllable by the at least one microprocessor.

16. The apparatus according to claim 1, further including a focusing lens that intersects said reflected light beams and is configured to focus light through said first and second window apertures and the liquid sample substantially toward the liquid sample light detector.

17. The apparatus according to claim 1, wherein each of the at least two LED modules includes an optical filter that is substantially translucent to a desired wavelength or band of wavelengths.

18. The apparatus according to claim 1, wherein said first and second windowed apertures are separated by between about 0.1 mm and 300 mm, thus defining a path length of light through said liquid sample between about 0.1 mm and about 300 mm.

19. The apparatus according to claim 1, wherein said at least one microprocessor is programmed to store a measurement of the transmittance of the liquid sample of known transmittance for each wavelength.

20. The apparatus according to claim 1, wherein said at least one microprocessor is programmed to compute a ratio of a measurement of transmittance of the liquid sample to a stored measurement of known transmittance resulting in a relative measurement of percent transmittance of the liquid sample for each wavelength.

21. The apparatus according claim 20, wherein said at least one microprocessor is programmed to compute a negative logarithm of said measurement of percent transmittance for each wavelength.

22. The apparatus according claim 1, wherein said at least one microprocessor is programmed to compute, using a correction algorithm, an adjusted value of percent transmittance for each wavelength.

23. The apparatus according claim 22, wherein the correction algorithm is a lookup-table of values.

24. The apparatus according to claim 22, wherein the correction algorithm is an equation.

25. The apparatus according claim 1, wherein said at least one microprocessor is programmed to compute a further output value based on multiple transmittance values attributed to different wavelengths of said LEDs of the at least two LED modules.

26. The apparatus according to claim 25, wherein said further output value is based on pre-determined weightings of multiple transmittance values attributed to different wavelengths of said LEDs of the at least two LED modules.

27. The apparatus according claim 1, wherein said at least one microprocessor is connected to actuators configured to and programmed to provide rotational and translational movement of the at least two LED modules in order to align the light beams reflected from each of the beam splitters in each of the at least two LED modules.

28. The apparatus according claim 1, wherein the first and second enclosing structures are each sealed:
- wherein the first and second enclosing structures are fixed with respect to each other and located in an outer structure configured to be immersed in a body of liquid and having at least one opening so as to allow the liquid to enter into said outer structure; and
- wherein the liquid is configured to be located between the first and second enclosing structures.

29. The apparatus according claim 1, wherein the first enclosing structure is located at one end of a liquid flow cell, the second enclosing structure is located at an opposing end of the liquid flow cell, and liquid flowing through said liquid flow cell is configured to be sampled by light emitted from said first enclosing structure into said second enclosing structure containing said liquid sample light detector.

* * * * *